United States Patent Office 3,644,282
Patented Feb. 22, 1972

3,644,282
TERNARY STABILIZER SYSTEM FOR POLYOLEFINS
Clarence R. Bresson, Bartlesville, Okla., assignor to Phillips Petroleum Company
No Drawing. Filed Feb. 24, 1969, Ser. No. 801,746
Int. Cl. C08f 45/58
U.S. Cl. 260—45.85                  6 Claims

ABSTRACT OF THE DISCLOSURE

A polymer stabilizer comprising mixtures of diesters of thiodicarboxylic acids. In another embodiment, said polymer stabilizer further comprises at least one hindered mono or polyphenolic compound. In another embodiment, said diesters of thiodicarboxylic acids are produced by reacting a mixture of alcohols characterized by the formulas ROH and R'OH wherein R and R' are the same or different and are hydrocarbon radicals selected from the group consisting of alkyl or cycloalkyl-substituted alkyl in the range of from 10 to 20 carbon atoms per R and R' group with at least one thiodicarboxylic acid of the formula $S-(C_nH_{2n}COOH)_2$ wherein $n$ is an integer from 1 to 6.

BACKGROUND OF THE INVENTION

This invention relates to stabilizers useful in the stabilization of organic polymers against deterioration in physical properties as a result of exposure to light and air particularly at elevated temperature and over long periods of time. Another aspect of this invention relates to stabilizing polymers of 1-olefins, more particularly polymers of 1-olefins having 3 to 8 carbon atoms per molecule. Another aspect of this invention relates to stabilizing polypropylene compositions. Another aspect of this invention relates to a stabilizer comprising mixtures of diesters of thiodicarboxylic acids. Another aspect of this invention relates to stabilizing systems comprising mixtures of diesters of thiodicarboxylic acids, and at least one hindered mono- or polyphenolic compound.

It is to be understood that the term "polymers of 1-olefins" used hereinafter in the specification includes homopolymers and copolymers of two or more of these 1-olefins. These polymers may also contain up to about 10 percent of other copolymerizable monomers.

Polypropylene, for example, is a tough, high-melting polymeric material, but its stability leaves much to be desired for certain applications. The polymer shows a tendency to decrease rapidly in melt viscosity and then to become brittle when kept at elevated temperatures for the time required in milling and calendering, or in extruding, injection molding, or fiber forming equipment. This deterioration is particularly serious when the polymer is worked in the molten state in the presence of oxygen, e.g., air. Shaped polymers prepared in such equipment show a tendency to discolor, to crack, and to powder around the edges upon exposure to sunlight. When the polymer or shaped polymer is heated at elevated temperatures, really an accelerated aging process, the problem is especially accentuated.

To meet commercial requirements, it is of course quite important that the polymer retain its physical properties during processing and thereafter. Considerable research directed towards solving problems of deterioration has led to the suggestion of a variety of stabilizers to counteract one or more types of deterioration. Most polypropylene on the market today contains one or more stabilizers. While it is now possible to stabilize polypropylene fairly well against deterioration in melt viscosity, this stabilization is not always accompanied by an inhibition of deterioration in other respects, such as embrittlement and discoloration at elevated temperatures. Stabilizers which can cope with embrittlement are not necessarily capable of preventing discoloration, or reduction in melt viscosity. In addition, the retention of the polymer's physical properties over long periods of time is particularly difficult to achieve.

A further problem arises from the fact that not all stabilizers and stabilizer systems are compatible with polyolefins; i.e., although prior art stabilizer systems have been effective in reducing degradative deterioration in physical properties, the stabilizer effect has been short-lived because these systems have either vaporized or have exuded to the surface of the polymer. A few prior researches have recognized the problem of compatibility with the polymer, but have failed to define a solution therefor. For instance, in U.S. Pat. 3,255,136, a stabilizer system of an organic mono- or polyhydric phenol, an organic phosphite, and a thiodipropionic acid ester has been proposed. Stabilization occurs as a result of the combination of the three above-mentioned compounds. In fact this patent notes that with combinations of any two of the compounds, a depressant effect on stabilizing of the individual components may be noted. This patent recognizes that the R radical of a thiodipropionic acid ester of the formula

$ROOCCH_2CH_2SCH_2CH_2COOY$ is important in furnishing compatibility with polypropylene. By definition in U.S. Pat. 3,255,136, the R represents an organic radical selected from the group consisting of hydrocarbon radicals such as alkyl, alkenyl, aryl, cycloalkyl, and mixed alkylaryl and mixed alkyl cycloalkyl radicals; hydroxyalkyl and hydroxyalkyloxyalkylene radicals. However, no distinction is drawn in this patent between any of the above-mentioned R radicals nor are any criteria given for the selection of radicals which will give superior compatibility. The dialkyl esters of thiodicarboxylic acids which have found the greatest acceptance in the prior art are dilauryl thiodipropionate, distearyl thiodipropionate, and in general dialkylthiodipropionates which contain even carbon number straight chain alkyl groups.

An object of this invention is to provide a stabilizer and a stabilizer system which when incorporated with the above-mentioned organic polymers exhibit a high compatibility with the polymer.

Another object of this invention is to produce a stabilizer and a stabilizer system useful in the stabilization of polymers of 1-olefins which protects the polymer against deterioration in physical properties as a result of exposure to light and/or air, particularly at elevated temperatures and over long periods of time.

SUMMARY OF THE INVENTION

Accordingly, this invention comprises a stabilizer for polymers of 1-olefins, as described above, comprising mixtures of diesters of thiodicarboxylic acids.

In further accordance with the instant invention, a stabilizer system for polymers of 1-olefins, as described above, is provided comprising mixtures of diesters of thiodicarboxylic acids and hindered mono or polyphenolic compounds.

In further accordance with the instant invention, the mixture of diesters of thiodicarboxylic acids are produced by esterifying a mixture of alcohols characterized by the formulas ROH and R'OH wherein R and R' are the same or different and are hydrocarbon radicals selected from the group consisting of alkyl or cycloalkyl, said mixture containing compounds wherein R and R' contain in the range of 10 to 20 carbon atoms per R or R' group with at least one thiodicarboxylic acid of the formula $$S—(C_nH_{2n}COOH)_2$$

wherein $n$ is an integer of from 1 to 6.

In still further accordance with the instant invention, the stabilizer system further comprises at least one hindered mono or polyphenolic compound which can be selected from 1,1,3 - tris(3-methyl-4-hydroxy-5-tert-butylphenyl)butane, tetrakis[3 - (3,5-di-tert-butyl-4-hydroxyphenyl)propionyloxymethyl]methane, 2,6 - di - tert-butyl-4-methylphenol, or the like.

DESCRIPTION OF PREFERRED EMBODIMENTS

Exemplary diesters of thiodicarboxylic acids are the products of the esterification reaction of a thiodicarboxylic acid and a mixture of alcohols of the formulas ROH and R'OH wherein R and R' are as described above.

In a presently preferred embodiment, the alcohol mixture is produced by the Oxo process. Olefin containing feedstock to the Oxo process is reacted with hydrogen and carbon monoxide in the presence of usually a cobalt-containing catalyst to produce an aldehyde containing product, said aldehydes containing one carbon atom per molecule more than their olefin precursors. The crude aldehyde is then generally reduced with hydrogen in the presence of a catalyst, typically a copper catalyst, to form a corresponding alcohol which is then fractionated to remove components which have boiling points outside the desired boiling range. It is believed that the Oxo alcohol contains predominantly branched constituents since it is well known that by the nature of the Oxo process even if the starting material contains only linear unbranched olefins, the Oxo product will contain approximately 40–60% branched material. It is also well known that the Oxo process produces only primary alcohols. The great bulk of the esters produced from these alcohols can then be called isoalkyl thiodicarboxylic acid esters or cycloalkylmethyl thiodicarboxylic acid esters.

Diesters of thiodicarboxylic acids of this invention are prepared by reacting a thiodicarboxylic acid and the mixture of Oxo alcohols as described above in the presence of sulfuric or a sulfonic acid. In general, temperatures of from 30 to 150° C. are employed, preferably from 50 to 100° C. Preferably, the esterification reaction is carried out in a diluent which is capable of azeotroping water. Suitable diluents include toluene, benzene, xylene, carbon tetrachloride, di-n-butyl ether, diethyl ether, chloroform, and the like. In general, conventional esterification conditions can be employed.

The mole ratio of thiodicarboxylic acid to Oxo alcohol is in the range of from 1:1 to 1:10, preferably in the range of 1:1.5 to 1:5. A catalytic amount of sulfuric acid or a sulfonic acid is provided, generally in the range of 0.1 to 10 g. per g. mole of thiodicarboxylic acid. The amount of diluent used is not critical and generally comprises 10–95 weight percent of the total liquid reaction medium.

In one presently preferred embodiment, the thiodicarboxylic acid, sulfonic acid, Oxo alcohol, and diluent are charged to a reactor and subsequently refluxed until the desired yield of thiodipropionate ester is productd as indicated by the amount of water of reaction produced and trapped by suitable means. Generally, nearly quantitative yields of the thiodipropionate esters are produced by this method. The thus formed reaction product can be separated and purified by conventional means. For example, the reaction product can be washed with aqueous caustic solution, aqueous solutions, and water to remove acid. Volatiles can be stripped. The residue can be treated with charcoal and a borohydride to deodorize and decolorize the material and filtration can be effected.

Examples of thiodicarboxylic acids which can be employed include 3,3'-thiodipropionic acid, 2,2'-thiodiacetic acid, 4,4'-thiodibutyric acid, 5,5'-thiodipentanoic acid and 7,7'-thiodiheptanoic acid.

Examples of some suitable sulfonic acids include methanesulfonic acid, ethanesulfonic acid, benzenesulfonic acid, p-toluenesulfonic acid, 1-hexanesulfonic acid, 1-heptanesulfonic acid, and the like.

The mixture of esters is complex in nature and difficult to analyze. Therefore, for the sake of simplicity the mixture of diesters of thiodicarboxylic acids will be referred to by the carbon number range of the alkyl or cycloalkylmethyl groups and by the particular dicarboxylic acid, for instance, 13–15 isoalkyl TDP thiodipropionates indicates a mixture of thiodipropionates wherein the alkyl and cycloalkylmethyl groups represented by R and R' are a mixture of groups containing $C_{13}$ to $C_{15}$ (13 to 15 carbon atoms per group) inclusive.

One property of the mixtures of diesters of the thiodicarboxylic acids of the instant invention which is totally unexpected is that they remain liquids at room temperatures. The thioesters which have received the widest use in the prior art, dilauryl-3,3'-thiodipropionate and distearyl-3,3'-thiodipropionate have melting points of 48 and 68° C. respectively and are solid at room temperature. These thiodipropionates must then be mixed with the polymer generally as granular solids and thus it is more difficult to obtain a good distribution of these materials in the polymers than with the liquids of the instant invention.

Stabilizers of the instant invention can be incorporated by simple blending or spraying on the polymer followed by drying or by other means known to the industry without resorting to the extra procedures which are necessary in formulating stabilizer systems which are solids at room temperature.

The diesters of thiodicaboxylic acids of the instant invention are useful as stabilizers more particularly antioxidants, in polymers formed from 1-olefins having 3 to 8 carbon atoms per molecule. However, it has also been found that the diesters of thiodicarboxylic acids of the instant invention are also useful as secondary antioxidants in stabilizer systems comprising one or more other stabilizers. In a preferred embodiment of the instant invention it has been found that a stabilizer system comprising the thioesters of the instant invention with at least one hindered mono or polyphenolic compound gives remarkable results.

Exemplary of a satisfactory mono-phenol is 2,6-di-tert-butyl-4-methylphenol.

Exemplary of the complex hindered polyphenolic compounds are 1,1,3-tris(2-methyl - 4-hydroxy-5-tert-butylphenyl)butane, tetrakis[3(3,5-di - tert-butyl-4-hydroxyphenyl)propionyloxymethyl]methane, and the like.

A sufficient amount of the above stabilizer system is used to improve the stability of the polymer against deterioration of physical properties, including discoloration and embrittlement, under the conditions to which the polymer will be subjected. Very small amounts are usually adequate. Amounts within the range of from about 0.15 to 3.5 preferably 0.5 to 2.5 parts by weight of the stabilizer composition per 100 parts of the polymer (php.) are employed for optimum stabilization.

For example, in the stabilization of polypropylene, the stabilizer system can comprise about 0.025 to about 0.5 php. each of 2,6-di-tert-butyl-4-methylphenol and either 1,1,3-tris(2 - methyl-4-hydroxy-5-tert-butylphenyl)butane or tetrakis[3-(3,5-di-tert - butyl - 4-hydroxyphenyl)propionyloxymethyl]methane and from about 0.05 to about 1.25 of the diester of the thiodicarboxylic acid.

The poly-1-olefins with which the stabilizer system of the instant invention can be used by any of those known by the industry, and can be made, for example, by the so-called high-pressure process, by the low pressure process of U.S. Pat. 2,825,721 or by the use of any of the known organometal catalyst systems. Examples of other copolymerizable monomers which can be present in the copolymer are butadiene, vinyl acetate, isoprene and the like. It is also within the scope of the invention to add other materials to the mixture of the polyolefin and stabilizers; e.g., plasticizing agents, lubricants, dyes, fillers, pigments, antistatic agents, and the like.

The stabilizing effect of the stabilizer system on polypropylene was evaluated in the following examples.

EXAMPLE I

Olefin containing hydrocarbon feedstocks were prepared by cracking an asphaltic residuum employing used silica alumina cracking catalyst. The feedstocks were fractionally distilled and redistilled over solid caustic to yield three separate fractions of an olefin-containing product designated as Cut I, Cut II, and Cut III. Cut I contained 31.6 weight percent olefins and an estimated (by boiling point) range of carbon content per molecule as follows.

| Carbon number: | Weight percent |
|---|---|
| 13 | 10.1 |
| 14 | 53.4 |
| 15 | 34.4 |
| 16 | 2.1 |

Cut II and a boiling range of 500–560° F. at 1 atm. and contained 25 weight percent of olefins. Cut III had a boiling range of 560–610° F. at 1 atm. and contained 20.4 weight percent olefins.

Run I was effected by charging a portion of Cut I to a loop reactor with cobalt carbonyl catalyst in sufficient quantity for cobalt to comprise 0.34 percent of the weight of the olefin in the feed. Synthesis gas (approximately 52 percent $H_2$; 48 percent CO) was pressured in the reactor at about 1900 p.s.i.g. for about 1.5 hours. The product thus formed was reduced with sodium borohydride to convert aldehydes therein to alcohols. The resulting Oxo alcohol product was then fractionally distilled and a heart cut was recovered having a boiling range of 321° F., 20 mm. Hg to 325° F., 16 mm. Hg.

A second run, Run II was effected in substantially the same manner as Run I except that a reaction time of about 2 hours, 10 minutes and a temperature of about 300–310° F. was employed. A heart cut in the approximate range of Run I was recovered.

An Oxo alcohol was then prepared by blending a mixture comprised of about 40 weight percent of the heart cut of Run I and 60 weight percent of the heart cut of Run II.

The thiodipropionate ester designated as $C_{13}$–$C_{15}$ isoalkyl TDP was prepared from this material.

Cut II was charged to a loop reactor with sufficient cobalt carbonyl catalyst to provide 0.96% cobalt based on the weight of olefins in the feed. Synthesis gas at about 1900 p.s.i.g. was pressured to the reactor and the reaction was effected at about 330° F. for 5.25 hours. The resulting Oxo product was reduced with sodium borohydride and fractionated. A heart cut of the resulting Oxo alcohols having a boiling point range of 600–650° F. (1 atm.) was recovered. This was the Oxo alcohol product used to prepare the thiodipropionate ester designated as $C_{16}$–$C_{18}$ isoalkyl TDP.

Cut III was charged to a loop reactor with sufficient cobalt carbonyl catalyst to provide 1.2% Co based on the olefin content of the feed. Synthesis gas at about 2000 p.s.i.g. was charged to the reactor and the reaction was effected at about 300° F. for about 4.5 hours. The resulting Oxo product was reduced with sodium borohydride and a heart cut of the resulting Oxo alcohols was the material used to prepare the thiodipropionate ester designated as $C_{19}$–$C_{21}$ isoalkyl TDP.

EXAMPLE II

The thiodipropionate esters were prepared according to the following general procedure. A mixture of one mole thiodipropionic acid, 2.2 moles Oxo alcohol, 1 g. of methane sulfonic acid and 100 ml. of toluene was heated to reflux temperature under a nitrogen atmosphere and water of esterification removed via a Dean-Stark trap. The mixture was cooled to 85° C., washed with 100 ml. 5 percent sodium hydroxide solution, 2×100 ml. water and 100 ml. saturated salt solution. Excess alcohol was removed under vacuum on a 45 cm. Vigreux column. The bottoms product was heated with 3 g. Nuchar activated charcoal and 0.5 g. sodium borohydride for three hours on a steam bath. The mixture was filtered through Celite to give a nearly quantitative yield of odorless thiodipropionate ester in each run.

EXAMPLE III

Polypropylene prepared by mass polymerization of propylene in the presence of catalyst systems comprising diethyl aluminum chloride and the reaction product of titanium tetrachloride and aluminum having the approximate formula $TiCl_3 \cdot 1/3 AlCl_3$ was treated with exemplary stabilizer systems of the instant invention. The stabilized samples were prepared by mixing polypropylene powder with acetone or benzene solutions of the antioxidants. All phenolic compounds were introduced as 1% acetone solutions, and the diesters of thiodipropionic acid were added as 1% benzene solutions. The solvent was evaporated and the polypropylene was compressed and molded in films 20 mils thick.

| | Embrittlement time, days (C) | | Melt flow, grams/10 min. (D) Residence time, minutes | | | | | |
|---|---|---|---|---|---|---|---|---|
| | | | A | | | B | | |
| Secondary antioxidant (0.2 php.) | A | B | 5 | 10 | 20 | 5 | 10 | 20 |
| $C_{13}$–$C_{15}$ isoalkyl TDP | 24 | 44 | 10 | 15 | 24 | 9.1 | 13 | 14 |
| $C_{16}$–$C_{18}$ isoalkyl TDP | 33 | 59 | 10 | 14 | 24 | 8.8 | 9.8 | 12 |
| $C_{19}$–$C_{21}$ isoalkyl TDP | 32 | 54 | 12 | 16 | 30 | 8.0 | 11 | 18 |
| DLTDP | 17 | 34 | 10 | 14 | 24 | 8.0 | 10 | 14 |
| DSTDP | 36 | 65 | 10 | 14 | 24 | 8.2 | 9.9 | 17 |
| DBTDP | 36 | 64 | 10 | 12 | 19 | 9.0 | 11 | 16 |
| LSTDP | 32 | 57 | 9.5 | 16 | 24 | 8.1 | 9.7 | 15 |
| None | 3 | | | | | | | |

(A) In polypropylene containing 0.1 php. 1,1,3-tris(2-methyl-4-hydroxy-5-tert-butylphenyl)butane and 0.1 php. 2,6-di-tert-butyl-4-methylphenol.
(B) In polypropylene containing 0.1 php. tetrakis[3-(3,5-di-tert-butyl-4-hydroxyphenyl)propionyloxymethyl]methane and 0.1 php. 2,6-di-tert-butyl-4-methylphenol.
(C) Five specimens were cut from a compression-molded film 20 mils thick and were aged in an air circulating oven at 150° C. These specimens were checked periodically for failure as indicated by the appearance of spot granulation, usually accompanied by discoloration. The average failure time for the five samples was reported as the embrittlement time.
(D) The change in melt flow was determined by adding 7.5 grams of the stabilized polymer to a melt indexer and the melt flow (grams/10 min.) at 550° F. was determined after dwell times of 5, 10, and 20 minutes.

| Compound name | Abbreviation | Molecular weight | Melting point, °C. | Composition, wt. percent | | | | $N_D^{20}$ |
|---|---|---|---|---|---|---|---|---|
| | | | | C | H | O | S | |
| $C_{13}$–$C_{15}$ isoalkyl 3,3'-thiodipropionate | $C_{13}$–$C_{15}$ isoalkyl TDP | [1] 590 | <25 | 71.9 | 11.6 | 10.7 | 5.3 | 1.4719 |
| $C_{16}$–$C_{18}$ isoalkyl 3,3'-thiodipropionate | $C_{16}$–$C_{18}$ isoalkyl TDP | [1] 640 | <25 | 74.1 | 12.0 | 9.3 | 4.5 | 1.4725 |
| $C_{19}$–$C_{21}$ isoalkyl 3,3'-thiodipropionate | $C_{19}$–$C_{21}$ isoalkyl TDP | [1] 726 | <25 | 75.1 | 12.2 | 8.0 | 4.3 | 1.4701 |
| Dilauryl-3,3'-thiodipropionate | DLTDP | [2] 515 | 48 | | | | | |
| Distearyl-3,3'-thiodipropionate | DSTDP | [2] 683 | 68 | | | | | |
| Dibehenyl-3,3'-thiodipropionate | DBTDP | [2] 795 | 49 | | | | | |
| Laurylstearyl-3,3'-thiodipropionate | LSTDP | [2] 599 | 49 | | | | | |

[1] Osmometer.  [2] Theoretical calculation.

The above data indicate that the stabilizer systems employing the diesters of thiocarboxylic acids of the instant invention, designated as $C_{13}$–$C_{15}$, $C_{16}$–$C_{18}$, and $C_{19}$–$C_{21}$ isoalkyl TDP are intermediate in embrittlement time for DLTDP at 17 days to 36 days with DSTDP and DBTDP when compounded with 1,1,3-tris(2-methyl-4-hydroxy-5-tert-butylphenyl)butane, and for DLTDP at 34 days to 65 days for DSTDP when compounded with tetrakis[3(3,5-di-tert - butyl - 4 - hydroxyphenyl)propionyloxymethyl] methane. These data show a surprising increase in embrittlement time when a secondary antioxidant of the instant invention is employed above the 3-day embrittlement time in the example where none was employed. It should be noted that the systems employing tetrakis[3-(3, 5-di-tert-butyl - 4 - hydroxyphenyl)propionyloxymethyl] methane have embrittlement times roughly double those obtained with 1,1,3-tris(2-methyl-4-hydroxy-5-tert-butylphenyl)butane.

Change in melt flow with time is an indication of polymer degradation, the higher the change, the greater the degradation. All of the above data on melt flow change are with acceptable limits; however, $C_{13}$–$C_{15}$ and $C_{16}$–$C_{18}$ isoalkyl TDP compounded with tetrakis[3-(3,5-di-tert-butyl-4-hydroxyphenyl)propionyloxymethyl]methane did show superior performance.

EXAMPLE IV

Another sample of polypropylene as prepared in Example III was tested with a stabilizing system which included 1,1,3-tris(2-methyl-4-hydroxy-5-tert-butylphenyl) butane, and the diesters of thiodicarboxylic acids of the instant invention. The compatibility of the various thiodipropionates with polypropylene was determined by preparing polymer samples and aging at room temperature. Samples were periodically examined for evidence of exudation and compared to controls.

| Stabilizer [a] | Php. | Time to exudation (days) |
|---|---|---|
| $C_{13}$–$C_{15}$ isoalkyl TDP | 1.0 | >180 |
| $C_{16}$–$C_{18}$ isoalkyl TDP | 1.0 | >180 |
| $C_{19}$–$C_{21}$ isoalkyl TDP | 1.0 | >180 |
| DLTDP | 1.0 | 30 |
| DSTDP | 1.0 | 4 |

[a] In polypropylene containing 0.1 php., 1,1,3-tris(2-methyl-4-hydroxy-5-tert-butylphenyl)butane.

Thus the thiodipropionate stabilizers of the instant invention did not show evidence of exudation, even after six months.

As indicated previously and as demonstrated by the specific examples the mixed diesters of the invention can be used to stabilize polymers of monoolefins, both homo- and copolymers, having from 3 to 8 carbon atoms, such as polypropylene, poly-1-butene, poly-1-hexene, poly-1-octene, propylene-butene copolymer, propylene-pentene copolymer, propylene-hexene copolymer, and the like. Of the above polymers, polymers of propylene and especially polypropylene are presently preferred.

I claim:

1. A stabilizer system for use in improving the resistance of polymers formed from 1-olefins having 3 to 8 carbon atoms per molecule to deterioration in physical properties on exposure to heat and light consisting of: (a) a mixture of diesters of thiodicarboxylic acids produced by esterifying (1) a mixture of alcohols produced by reacting an olefin containing feedstock with hydrogen and carbon monoxide in the presence of a catalyst to produce an aldehyde which is then reduced with hydrogen to form the corresponding alcohol with (2) at least one thiodicarboxylic acid of the formula S—$(C_nH_{2n}COOH)_2$ wherein $n$ is an integer from 1 to 6 wherein the mole ratio of thiodicarboxylic acid to said alcohol is from 1:1 to 1:10 wherein said diesters are chosen from the group consisting of (i) diesters produced from a distillation fraction of said alcohol having alkyl radicals of 13 to 15 carbon atoms and a boiling range of 321° F., 20 mm. Hg to 325° F., 16 mm. Hg; (ii) diesters produced from a distillation fraction of said alcohol having alkyl radicals of 16 to 18 carbon atoms and a boiling range of 600 to 650° F. at one atmosphere and (iii) diesters having an average molecular weight of 726 and a composition by weight of about 75 percent carbon, about 12 percent hydrogen, about 8 percent oxygen and about 4 percent sulfur produced from a fraction of said alcohol having alkyl radicals of 19 to 21 carbon atoms; (b) a complex hindered multiphenolic compound and (c) a hindered monohydric phenolic compound.

2. A stabilizer system according to claim 1 wherein (1) is 1,1,3-tris(3-methyl-4-hydroxy-5-tert-butylphenyl)butane or tetrakis[3-(3,5-di-tert-butyl - 4 - hydroxyphenyl)propionyloxymethyl]methane and (2) is 2,6-ditertiary butyl-4-methylphenol.

3. A composition of matter having improved resistance to discoloration and embrittlement on aging and heating consisting of (a) a polymer formed from 1-olefins having 3 to 8 carbon atoms per molecule; (b) a mixture of dialkyl esters of thiodicarboxylic acids produced by esterifying (1) a mixture of alcohols produced by reacting an olefin containing feedstock with hydrogen and carbon monoxide in the presence of a catalyst to produce an aldehyde which is then reduced with hydrogen to form the corresponding alcohol with (2) at least one thiodicarboxylic acid of the formula S—$(C_nH_{2n}COOH)_2$ wherein $n$ is an integer from 1 to 6 wherein the mole ratio of thiodicarboxylic acid to said alcohol is from 1:1 to 1:10 wherein said diesters are chosen from the group consisting of (i) diesters produced from a distillation fraction of said alcohol having alkyl radicals of 13 to 15 carbon atoms and a boiling range of 321° F., 20 mm. Hg to 325° F., 16 mm. Hg; (ii) diesters produced from a distillation fraction of said alcohol having alkyl radicals of 16 to 18 carbon atoms and a boiling range of 600 to 650° F. at one atmosphere and (iii) diesters having an average molecular weight of 726 and a composition by weight of about 75 percent carbon, about 12 percent hydrogen, about 8 percent oxygen and about 4 percent sulfur produced from a fraction of said alcohol having alkyl radicals of 19 to 21 carbon atoms; (c) a complex hindered multiphenolic compound and (d) a hindered monohydric phenolic compound.

4. A composition of matter according to claim 3 wherein (c) is 1,1,3-tris(2-methyl-4-hydroxy-5-tert-butylphenyl) butane or tetrakis[3-(3,5-di-tert-butyl-4 - hydroxyphenyl) propionyloxymethyl]methane and (d) is 2,6-ditertiary butyl-4-methylphenol.

5. A composition of matter according to claim 4 wherein (b) is present in an amount equal to about 0.05 to about 1.25 parts by weight per 100 parts of polymer, (c) and (d) are each present in an amount equal to about 0.025 to about 0.5 part by weight per 100 parts of polymer.

6. A composition of matter according to claim 3 wherein said polymer is a polymer of propylene.

References Cited
UNITED STATES PATENTS

| | | | |
|---|---|---|---|
| 3,344,113 | 9/1967 | Alheim et al. | 260—45.85 |
| 3,409,587 | 11/1968 | Mills | 260—45.85 |

DONALD E. CZAJA, Primary Examiner

V. P. HOKE, Assistant Examiner

U.S. Cl. X.R.

252—404, 406; 260—45.95